United States Patent [19]

Stein

[11] Patent Number: 4,883,368
[45] Date of Patent: Nov. 28, 1989

[54] GREASE INJECTOR FOR BICYCLE CRANK BEARINGS

[76] Inventor: James A. Stein, 711½ Miller Valley Rd., Prescott, Ariz. 86301

[21] Appl. No.: 130,208

[22] Filed: Dec. 8, 1987

[51] Int. Cl.[4] .................. G05G 1/14; F01M 11/04; F16C 9/21; F16C 33/66

[52] U.S. Cl. .................. 384/458; 74/594.1; 184/105.1; 384/462; 384/466; 384/504; 384/517

[58] Field of Search .............. 384/462, 457, 458, 466, 384/474, 431, 504, 517, 519; 184/105.1, 105.3; 74/594.1

[56] References Cited

U.S. PATENT DOCUMENTS

| 1,856,959 | 5/1932 | Kopsky | 384/458 |
| 4,406,504 | 9/1983 | Coenen et al. | 384/458 X |
| 4,606,655 | 8/1986 | Hofmann | 384/458 |
| 4,738,551 | 4/1988 | Chi | 384/519 |

FOREIGN PATENT DOCUMENTS

| 918736 | 10/1954 | Fed. Rep. of Germany | 384/474 |
| 382976 | 2/1908 | France | 384/458 |
| 898478 | 4/1945 | France | 384/458 |
| 59206 | 4/1938 | Norway | 384/458 |
| 77774 | 7/1933 | Sweden | 384/517 |
| 198298 | 9/1938 | Switzerland | 384/474 |

Primary Examiner—Thomas R. Hannon

[57] ABSTRACT

This invention relates to a device by which the pedal crank bearings of a bicycle may have the grease replaced without disassembly of the mechanism. The invention is to be installed into existing bicycle crank bearing assemblies.

19 Claims, 1 Drawing Sheet

GREASE INJECTOR FOR BICYCLE CRANK BEARINGS

SUMMARY OF THE INVENTION

The invention relates to a device by which bearing lubrication can be replaced in a bicycle crank bearing without need for dissassembly by injecting grease into a fitting under pressure and directing it to the bearings. The invention relates to bicycle crank bearings with ball bearing races, henceforth referred to as bearing cups, located into a cylindrical housing referred to as the bottom bracket shell.

A BRIEF DESCRIPTION OF THE DRAWINGS

The invention may be more readily described by reference to the accompanying drawings.

A DESCRIPTION OF THE PREFERRED EMBODIMENTS

Figure 1:
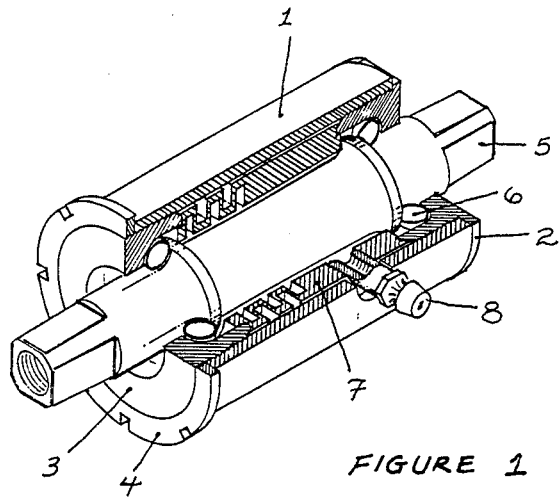
FIG. 1 shows an isometric view of a bicycle crank bearing housing with a cut away section revealing a sectional view of the bearing mechanism with the invention in place.
Figure 2:
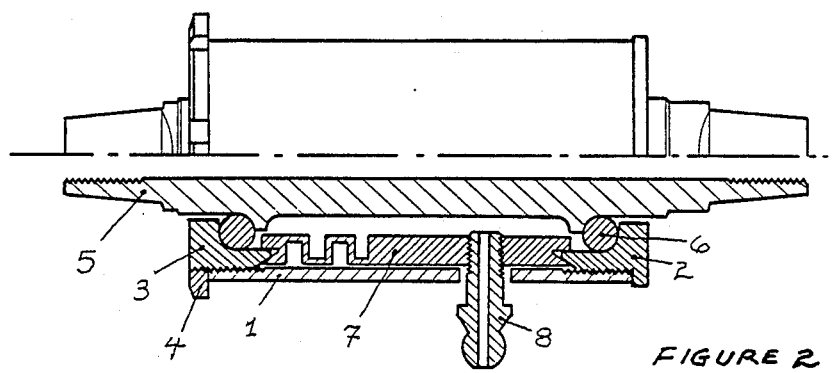
FIG. 2 shows a half section of the isometric view shown in FIG. 1.

The crank housing 1 consists of a metal tube with internal threads in each end. The crank housing is attached to the tubes to produce the frame of the bicycle. The crank housing generally has radially drilled holes in its periphery on the centerlines of the frame tubes. The bearing cups 2 and 3 are threaded on their outer circumference and thread into the crank housing. Bearing cup 2 is threaded until the shoulder of which meets the end of the crank housing. Bearing cup 3 is retained by means of an internally threaded lockring 4. The spindle 5 turns on ball bearings 6 within the bearing cups. The invention is composed of a tubular sleeve 7 coaxially located over the crank spindle and between the bearing cups with the entire assembly inside of the crank housing. The sleeve is composed of a polymer plastic material with elastic properties. This sleeve is produced such that the ends are perpendicular to the axis of the bearing assembly and provided with sealing surfaces where it contacts the bearing cups. The length is such that when the crank bearings are properly adjusted, the corrugations in the sleeve permit it to compress and seal against the face, outer tapered surface and the inner edge of the bearing cups. This seal can be any combination of surfaces described. FIG. 2 shows the outer tapered surface of the bearing cup sealing against a mating tapered surface of the invention. The sleeve is produced from a material such that after it as been installed into the bicycle crank housing with a properly sized hole in its surface, it can be drilled and have a grease fitting 8 threaded into the hole producing its own threads. The grease to lubricate the bearings is then introduced through the grease fitting under pressure and travels between the sleeve and the crank spindle into the bearings forcing out the contaminated grease between the spindle and the bearing cups. The sleeve is produced from this material also to provide enough resilience to form a seal where it contacts the bearing cup. The seals provide that the grease injected into the invention will only be forced out between the spindle 5 and the bearing cups 2 and 3 and will not leak out into the frame through the radially drilled holes in the crank housing on the centerlines of the frame tubes.

Figure 3:
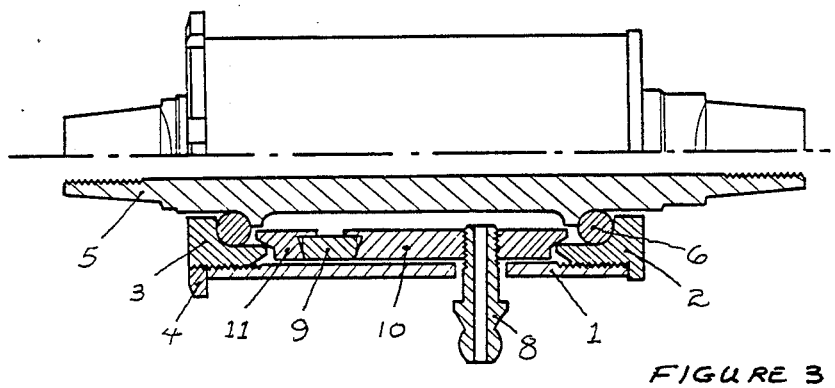
FIG. 3 shows an alternate method of producing the invention in a half section view.

FIG. 3 shows an alternate method of producing the invention using a ring of an elastomer material 9 to make the overall length of the sleeve adjustable and to provide the necessary pressure of the sealing surface against the bearing cups. This has the same effect as the corrugated section shown in the second of FIG. 2. The main body of the invention is composed of two lengths of tubular section material 10 and 11 one end of which is provided with a sealing surface to seal against the bearing cup. FIG. 3 shows an externally tapered sealing surface of the invention which fits inside the inner diameter of the bearing cup and provides a seal as it is forced into the cup by the elastomer ring. The inner end of the lengths of tubing are provided with a reduced outside diameter with an undercut in the surface between the reduced diameter and the outer diameter of the sleeve. The two of these lengths of tubing are connected by a ring of elastomer material, the inside diameter of which slips over the reduced outside diameter of the lengths of tubing. As the sleeves are compressed, the elastomer material is squeezed down into the undercut between the outside diameter and the reduced diameter of the sleeve to provide the pressure necessary to seal against the bearing cups.

Figure 4:
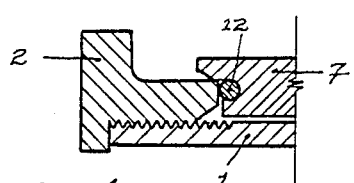
FIG. 4 and 5 show alternate methods of sealing the sleeve of the invention to the bearing cups showing a detail section view of the sleeve sealing against the bearing cup.
Figure 5:
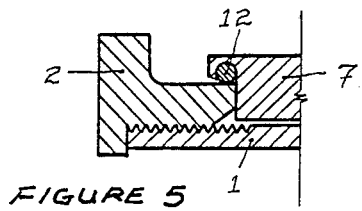

FIGS. 4 and 5 show alternate methods of sealing the sleeve comprising the body of the invention to the bearing cup. FIG. 4 shows a rubber o-ring compressed in an axial direction between the body and the bearing cup. FIG. 5 shows a rubber o-ring located co-axially to the assembly with radial contact between the body and the bearing cup.

What is claimed is:

1. Apparatus disposed intermediate bearing cups of opposed bearings within a bicycle crank bearing assembly for encircling a spindle supported by the bearings, said apparatus comprising in combination:
   (a) a sleeve for encircling the spindle intermediate the opposed bearings;
   (b) first means disposed at one end of said sleeve for sealingly engaging one of the bearing cups;
   (c) second means disposed at the other end of said sleeve for sealingly engaging the other of the bearing cups;
   (d) means for urging said first and second engaging means into sealing engagement with their respective bearing cups; and
   (e) valve means for injecting a lubricant within said sleeve to force lubricant longitudinally within said sleeve and through the opposed bearings.

2. The apparatus as set forth in claim 1 wherein at least one of said first and second engaging means includes a frustoconical surface for engaging the respective one of the bearing cups.

3. The apparatus as set forth in claim 2 wherein each of said first and second engaging means includes a frustoconical surface for engaging the respective one of the bearing cups.

4. The apparatus as set forth in claim 2 wherein said frustoconical surface is an exterior frustoconical surface.

5. The apparatus as set forth in claim 1 wherein said urging means includes a compressible annular member for engaging the respective bearing cups.

6. The apparatus as set forth in claim 5 wherein at least one of said first and second engaging means includes a frustoconical surface for engaging the respective one of the bearing cups.

7. The apparatus as set forth in claim 5 wherein each of said first and second engaging means includes a frustoconical surface for engaging the respective one of the bearing cups.

8. The apparatus as set forth in claim 1 wherein said urging means comprises a compressible member compressed upon installation of said sleeve.

9. The apparatus as set forth in claim 8 wherein at least one of said first and second engaging means includes a frustoconical surface for engaging the respective one of the bearing cups.

10. The apparatus as set forth in claim 8 wherein at least one of said first and second engaging means includes a frustoconical surface for engaging the respective one of the bearing cups.

11. The apparatus as set forth in claim 8 wherein said compressible member is an annular member.

12. The apparatus as set forth in claim 11 wherein said sleeve includes a first section disposed on one side of said annular member and a second section disposed on the other side of said annular member, said first and second sections and said annular member being axially aligned with one another.

13. The apparatus as set forth in claim 12 including means for retaining said annular member intermediate said first and second sections.

14. The apparatus as set forth in claim 8 wherein said annular member comprises a convoluted annular section.

15. The apparatus as set forth in claim 1 wherein said sleeve encircles the spindle in a non contacting relationship.

16. The apparatus as set forth in claim 1 wherein said sleeve in combination with the bearing cups provides a cylinder like volume laterally impermeable to the flow of lubricant for directing a flow of lubricant through the bearings in response to injection of lubricant through said valve.

17. The apparatus as set forth in claim 16 wherein said valve comprises a grease fitting.

18. The apparatus as set forth in claim 17 including means for threadedly retaining said grease fitting with said sleeve.

19. The apparatus as set forth in claim 18 wherein the crank bearing assembly includes an aperture for penetrably receiving said grease fitting.

* * * * *